(12) United States Patent
Potisch et al.

(10) Patent No.: US 6,394,542 B2
(45) Date of Patent: May 28, 2002

(54) FIXTURE FOR COVERING A GAP BETWEEN THE BACKREST AND THE LOWER PART OF A SEAT OF A MOTOR VEHICLE

(75) Inventors: Robby Potisch, Burscheid; Clemens Lowinski, Hilden; Jürgen Küttner, Leverkusen, all of (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/732,377

(22) Filed: Dec. 7, 2000

(30) Foreign Application Priority Data

Dec. 7, 1999 (DE) .......................................... 299 21 499

(51) Int. Cl.$^7$ ................................................. A47C 31/00
(52) U.S. Cl. .................. 297/182; 297/218.3; 297/463.1; 297/463.2
(58) Field of Search ............................. 297/182, 219.1, 297/463.1, 463.2, 218.3

(56) References Cited

U.S. PATENT DOCUMENTS

| | | |
|---|---|---|
| 1,985,222 A | 12/1934 | Menhall |
| 2,105,997 A | 1/1938 | Church |
| 2,536,592 A | 1/1951 | Caesar et al. |
| 4,059,306 A | 11/1977 | Harder, Jr. |
| 4,320,922 A | 3/1982 | Meritis |
| 5,161,854 A * | 11/1992 | Yokoto et al. .......... 297/182 X |

FOREIGN PATENT DOCUMENTS

| | | |
|---|---|---|
| EP | 0 634 303 B1 | 1/1995 |
| GB | 2 174 598 A | 11/1986 |

* cited by examiner

*Primary Examiner*—Anthony D. Barfield
(74) *Attorney, Agent, or Firm*—Foley & Lardner

(57) ABSTRACT

A fixture for covering a gap between a reclinable back rest and a lower seat part of a motor vehicle. A flat flexible cover element is coupled to the lower seat part and the back rest, wherein the cover element is guided through a slit-shaped guide opening in the back rest, and is suspended inside the back rest via tension spring means.

7 Claims, 3 Drawing Sheets

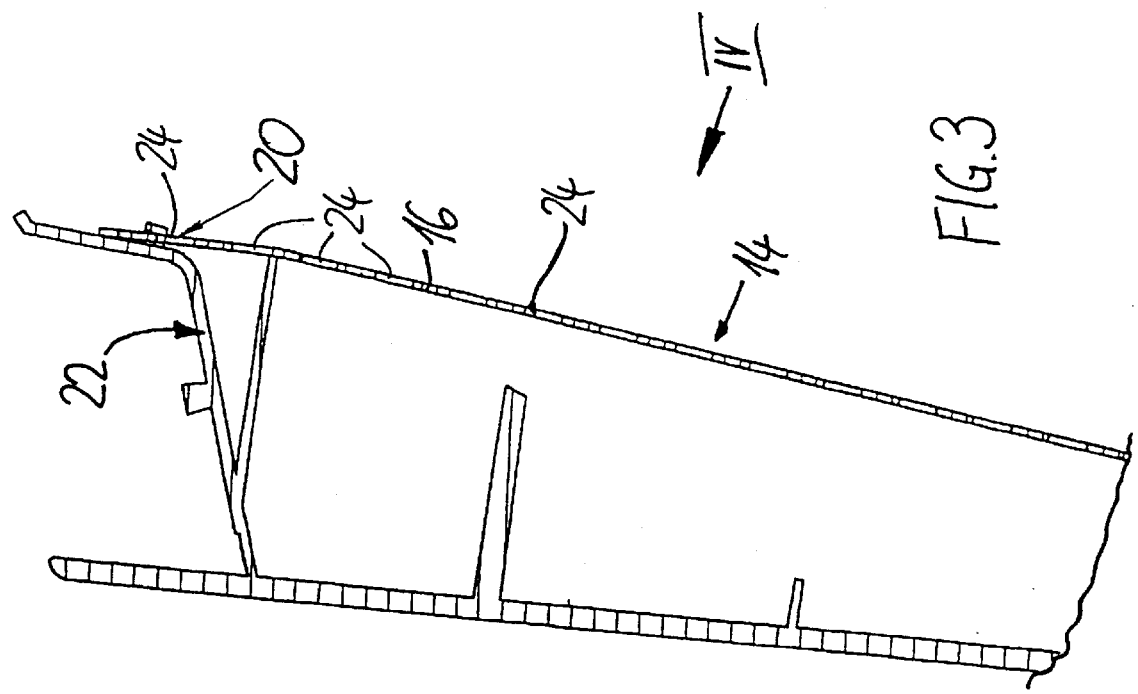
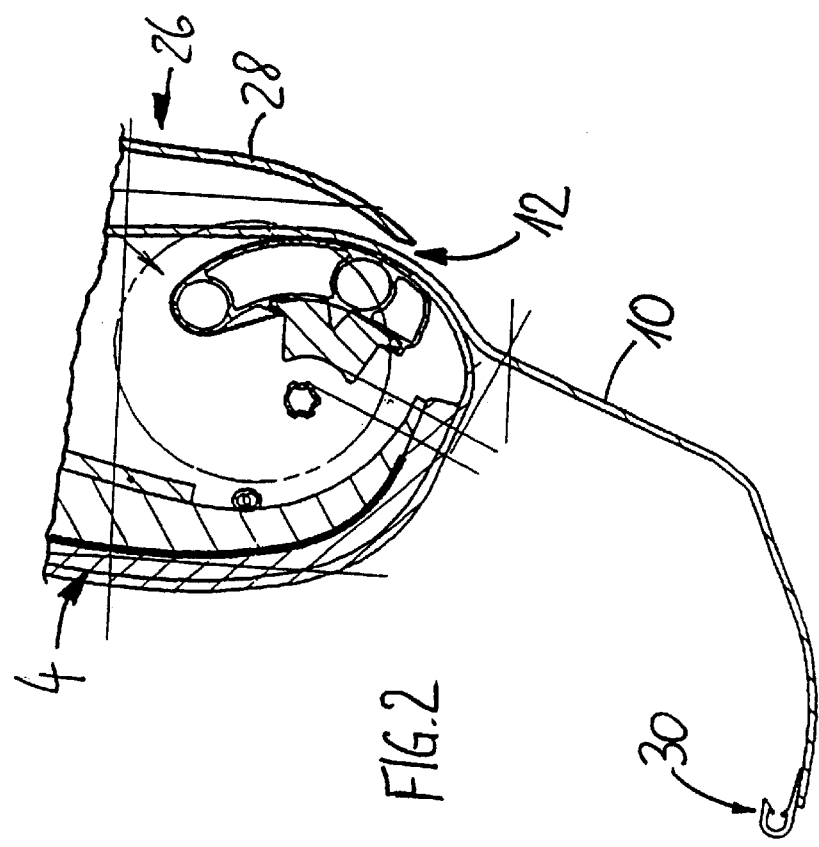

FIXTURE FOR COVERING A GAP BETWEEN THE BACKREST AND THE LOWER PART OF A SEAT OF A MOTOR VEHICLE

BACKGROUND OF THE INVENTION

The invention concerns a fixture for covering a gap especially between a reclinable backrest and a lower seat part, particularly a separately adjustable part of a seat of a motor vehicle, including a flat flexible cover element which is attached, on the one hand, to the seat part and, on the other hand, to the backrest to bridge the gap. The fixture is elastically suspended on one side.

Such a flexible fixture is known from European patent publication 0,634,303 B1. This publication describes a covering for the backrest of the seat of a motor vehicle, wherein a dimensionally stable molded part which covers the back of the upholstery of the backrest at its lower end has an extension which grips toward the front under the seat. This extension consists therefore of the same dimensionally stable material, but is configured to be flexible to adapt to each inclination of the backrest in such a way that it is provided with several bending grooves which run essentially parallel to a pivot axis of the backrest. In this way, a very complicated manufacture results. The extension is suspended at its lower free end via elastic elements, for example, springs or rubber strings on the lower side of the seat structure, that is, disadvantageously in an area which can be reached by the feet and which is in this way endangered mechanically and also with respect to contamination. By means of this known fixture, practically the entire rear area of the seat is covered by the molded part and its extension. The construction of the rear area is therefore largely determined by the covering.

The object of the invention is to create a fixture of the kind described above, which allows improved or expanded construction possibilities, together with an economic production and mounting, especially of the rear area of the backrest.

According to the invention, this is achieved by attaching the cover element on the seat part essentially rigidly, that is, inelastically in the direction of tension; the cover element is guided through a slit-shaped guide opening in the backrest, and suspended there inside the backrest via tension spring means.

By means of the invention, the construction of the backrest at its rear part can be advantageously fully independent from the cover element, since the same lies inside the backrest and is therefore completely out of sight. The back rest can thereby also have any desired configuration at its rear side, for example, it can be made from a conventional covering fabric (textile, leather, or the like) and, if necessary, also have additional equipment such as, for example, at least one pocket for objects to be held therein. The spring elastic suspension inside the backrest has the fundamental advantage with respect to the state of the art wherein the elastic elements in the lower area of the seat could be touched by the feet, that the tension spring means are accommodated completely protected against contamination, mechanical damage, and/or undesired detachment by contact. The cover element is therefore made of a material which is flexible per se, especially a carpet-like textile material, which also leads to an economic manufacture. At the same time, a mechanic strength can also be attained in that the carpet-like material is configured relatively firm and rigid, but still flexible. The inelastic attachment in the lower area of the seat part takes place purposefully via hook elements, which is also advantageous for mounting.

Other advantageous embodiment features of the invention are contained in the dependent claims.

BRIEF DESCRIPTION OF THE DRAWINGS

The invention will be described in more detail with reference to the exemplary embodiments which can be seen in the drawings, wherein:

FIG. 2 shows an enlarged illustration of the area 11 of FIG. 1, but leaving out the lower seat part;

FIG. 3 shows an enlarged detail illustration of the upper suspension of the cover element or the tension spring means—not shown in FIG. 1

DETAILED DESCRIPTION OF THE PREFERRED EMBODIMENTS

Figure 1:
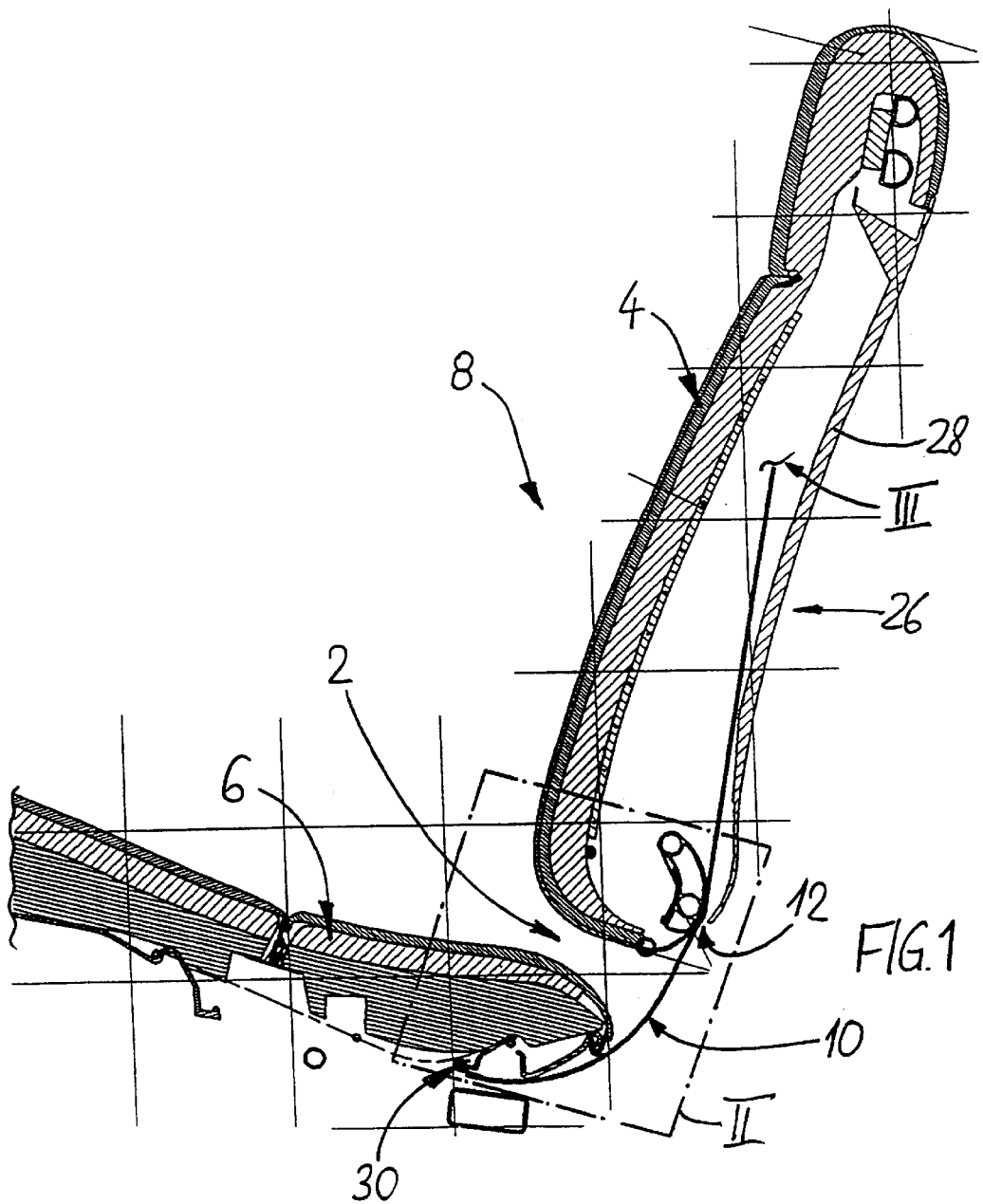
FIG. 1 shows a side view in vertical section of a seat equipped with a fixture according to the invention.
Figure 4:
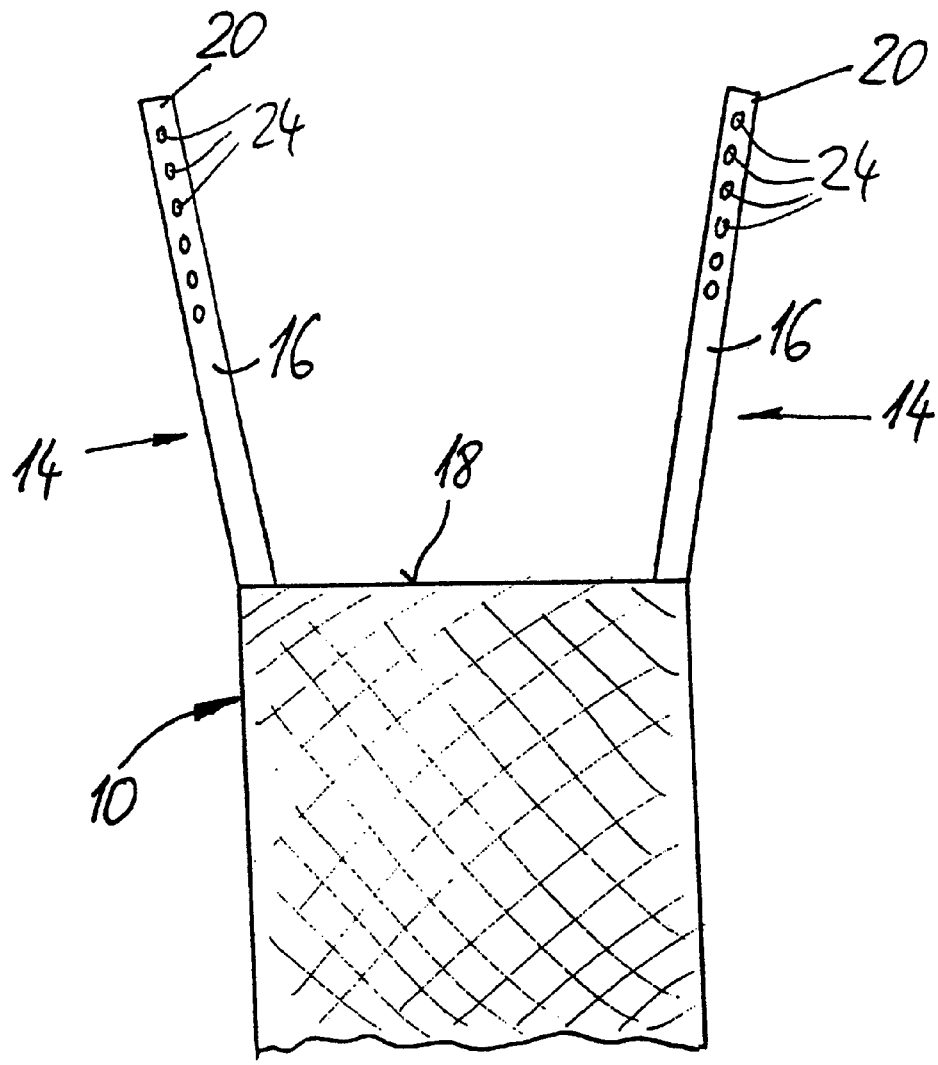
—and FIG. 4 shows a schematic plan view of the upper area of the tension spring means in the direction of arrow IV, according to FIG. 3.

As can be seen in FIG. 1, the fixture according to the invention serves for covering a gap 2 formed between a particularly reclinable backrest 4 and a lower part, particularly a separately adjustable seat part 6 of a seat 8 of a motor vehicle. The fixture consists of a flat flexible cover element 10 (compare also with FIG. 4) which is attached, on the one hand, to the seat part 6 and, on the other hand, to the backrest 4 for an essential sealing or covering bridging of the gap 2 and which is thereby spring elastically suspended on one side to ensure an adaptation to the different inclinations of the backrest 4.

According to the invention, the cover element 10 in the lower rear area of the seat part 6 is essentially rigid, that is, it is inelastically attached in the direction of tension, is guided from there backward and upward through slit-shaped guide openings 12 in the backrest 4, arranged in the lower and rear area of the backrest, and is also elastically suspended there inside the backrest 4 via tension spring means 14. For this purpose, reference is made to FIGS. 3 and 4, according to which the tension spring means 14 are formed by (at least) two rubber elastic, band-shaped or string-shaped, tension elements 16. According to FIG. 4, the tension elements 16 are connected to the upward-facing edge 18 of the cover element 10, guided along the two sides of the backrest 4, and run preferably somewhat at an angle outwardly and upwardly. Each tension element 16 is releasably suspended with its free end 20 extending away from the cover element 10 on a holding part 22 (shown only in FIG. 3) rigidly arranged in the backrest 4. In the preferred exemplary embodiment, each tension element 16 has at least one hole opening 24, which is suspended on the holder part 22, which is hook-shaped for this purpose. It is particularly advantageous if the tension elements 16 have several hole openings 24 distributed in the longitudinal direction so that, to vary the tension force, different hole openings 24 can be suspended on the holder part 22.

As can be seen in FIGS. 1 and 2, the backrest 4 has a preferably releasably attached cover 28 on its rear side 26 facing away from the seat part so that by releasing the cover 28, an access opening is formed for suspending or unhooking the tension spring means 14. After attaching the cover 28, a guide opening 12 for the cover element 10 remains on the backrest 4. The cover 28 thereby forms a kind of cover whose rear side forms the rear surface of the backrest 4, wherein the rear surface can be configured in any desired manner.

On the lower seat part 6 is preferably fixedly, that is, inelastically suspended the cover element 10 in the lower area of a seat pan (seat rack) preferably via hook elements 30.

It is preferred that the cover element 10 be made of a textile carpet-like material, for example, a material known under the denomination "Dilour."

The backrest 4 or the cover 28 can have pocket-like or net-like holders on the rear side 26, which are attached at least partially to the cover 28.

The invention is not limited to the exemplary embodiments shown and described but comprises also all the embodiments which can produce an effect in the sense of the invention. Furthermore, the invention is not limited to the feature combination defined in claim 1 but can also be defined by any other desired combination of specific features of all the disclosed individual features. This basically means that practically each individual feature of claim 1 can be omitted or substituted with another individual feature disclosed at another point of the disclosure. Insofar, claim 1 is merely to be understood as a first attempt of formulation of an invention.

What is claimed is:

1. A vehicle seat, comprising:
   a flat flexible cover element coupled to a lower seat part and a backrest, wherein the cover element is guided through a slit-shaped guide opening in the backrest, and is suspended inside the backrest via tension spring means, wherein the tension spring means are formed by at least two tension elements, each releasably suspended by a free end on a rigid holder part arranged inside the backrest, wherein the holder part is configured as a hook such that the tension elements can be suspended on the holder part; and
   a plurality of hole openings defined in each tension element, wherein the tension force can be varied by changing the hole opening that is suspended on the holder part.

2. The vehicle seat according to claim 1, wherein the tension spring means are elastic band-shaped tension elements.

3. The vehicle seat according to claim 1, wherein the tension elements are connected to an upward facing edge of the cover element.

4. The vehicle seat according to claim 1, wherein the backrest has a releasably attached cover on its rear side facing away from the seat part so that by releasing the cover an access opening can be formed for suspending or unhooking the tension spring means.

5. The vehicle seat according to claim 1, wherein the cover element is coupled beneath the lower seat part via hook elments.

6. The vehicle seat according to claim 1, wherein the cover element is made of carpet.

7. The vehicle seat according to claim 1, wherein the backrest has a holder on its rear side.

* * * * *